United States Patent
Punadikar et al.

(10) Patent No.: US 11,575,657 B2
(45) Date of Patent: Feb. 7, 2023

(54) MITIGATING MISINFORMATION IN ENCRYPTED MESSAGING NETWORKS

(71) Applicant: International Business Machines Corporation, Armonk, NY (US)

(72) Inventors: Sachin Chandrakant Punadikar, Pune (IN); Sasikanth Eda, Vijayawada (IN); Abhishek Jain, Baraut (IN); Sandeep Ramesh Patil, Pune (IN)

(73) Assignee: International Business Machines Corporation, Armonk, NY (US)

( * ) Notice: Subject to any disclaimer, the term of this patent is extended or adjusted under 35 U.S.C. 154(b) by 312 days.

(21) Appl. No.: 16/800,361

(22) Filed: Feb. 25, 2020

(65) Prior Publication Data

US 2021/0266298 A1    Aug. 26, 2021

(51) Int. Cl.
*H04L 9/40* (2022.01)
*G06F 16/23* (2019.01)
*H04L 9/14* (2006.01)

(52) U.S. Cl.
CPC ...... *H04L 63/0428* (2013.01); *G06F 16/2365* (2019.01); *H04L 9/14* (2013.01)

(58) Field of Classification Search
CPC ...... G06F 16/2365; H04L 9/14; H04L 63/042
USPC ......................................................... 713/160
See application file for complete search history.

(56) References Cited

U.S. PATENT DOCUMENTS

| | | | | |
|---|---|---|---|---|
| 6,044,155 A * | 3/2000 | Thomlinson | | H04L 63/12 380/281 |
| 6,834,346 B1 * | 12/2004 | Ishibashi | | G06F 21/72 713/153 |
| 7,900,260 B2 * | 3/2011 | Hirst | | G06F 21/6209 726/26 |
| 7,962,741 B1 * | 6/2011 | Alexander | | H04L 63/0485 713/192 |
| 9,787,757 B2 | 10/2017 | Yu | | |
| 9,917,803 B2 | 3/2018 | Chang et al. | | |

(Continued)

OTHER PUBLICATIONS

Ciara Nugent, "WhatsApp's Fake News Problem Has Turned Deadly in India Here's How to stop It", Time, https//time.com/5352516.india-whatsapp-fake-news/, Aug. 1, 2018, pp. 1-6.

*Primary Examiner* — Amare F Tabor
(74) *Attorney, Agent, or Firm* — Kunzler Bean & Adamson

(57) ABSTRACT

A method for mitigating misinformation in encrypted messaging environments includes receiving content from an originating user, encrypting the content into an originating message using a first encrypting key, appending an originating message identifier to the originating message, storing the originating message identifier on a messaging server in conjunction with transmitting the originating message to a first device corresponding to a first recipient, decrypting the originating message using a first decrypting key, storing the content on the first device to produce locally stored content and inserting the originating message identifier within metadata for the locally stored content. The method may also include encrypting the locally stored content into a new message intended for a second recipient, detecting the originating message identifier within the metadata for the locally stored content, and appending the originating message identifier to the new message. A corresponding system and computer program product are also disclosed herein.

20 Claims, 6 Drawing Sheets

(56) References Cited

U.S. PATENT DOCUMENTS

| | | | |
|---|---|---|---|
| 2004/0010691 A1* | 1/2004 | Nelson | G06F 21/64 |
| | | | 713/176 |
| 2005/0273611 A1* | 12/2005 | Yoshimura | H04N 1/32101 |
| | | | 713/176 |
| 2009/0235303 A1* | 9/2009 | Yamaoka | H04N 21/44204 |
| | | | 380/278 |
| 2012/0155645 A1* | 6/2012 | Prochaska | H04L 9/12 |
| | | | 380/278 |
| 2013/0018823 A1 | 1/2013 | Masood | |
| 2014/0068729 A1* | 3/2014 | Svigals | G06F 21/31 |
| | | | 726/5 |
| 2016/0197938 A1* | 7/2016 | van Overbruggen | G06F 21/16 |
| | | | 726/30 |
| 2019/0044728 A1* | 2/2019 | Karmoose | H04L 9/3297 |
| 2019/0179861 A1 | 6/2019 | Goldenstein et al. | |
| 2019/0280858 A1* | 9/2019 | Cam | H04L 9/30 |
| 2020/0004882 A1* | 1/2020 | Kulkarni | G06F 17/18 |
| 2020/0250676 A1* | 8/2020 | Sierra | G06Q 20/4016 |
| 2020/0396210 A1* | 12/2020 | Taylor | H04L 63/04 |

* cited by examiner

MITIGATING MISINFORMATION IN ENCRYPTED MESSAGING NETWORKS

BACKGROUND

The subject matter disclosed herein relates generally to mitigating misinformation and specifically to mitigating misinformation in encrypted messaging networks.

Social media and electronic messaging have increased the speed and quantity of worldwide communications. Unfortunately, the potential of intentionally or unintentionally spreading misinformation has also increased. In addition to reducing misinformation in social media networks, it is also desirable to reduce misinformation in encrypted messaging networks where the content of messages may not be readily accessible to the messaging system.

SUMMARY OF THE INVENTION

A method for mitigating misinformation in encrypted messaging environments includes receiving content from an originating user, encrypting the content from the originating user into an originating message using a first encrypting key, appending an originating message identifier to the originating message, storing the originating message identifier on a messaging server in conjunction with transmitting the originating message to a first device corresponding to a first recipient, decrypting the originating message using a first decrypting key, storing the content from the originating user on the first device to produce locally stored content and inserting the originating message identifier within metadata for the locally stored content.

The method may also include receiving a request from the first recipient to send the locally stored content to a second recipient, detecting the originating message identifier within the metadata for the locally stored content encrypting the locally stored content into a new message and appending the originating message identifier to the new message. A corresponding system and computer program product for executing the above method are also disclosed herein.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION OF THE INVENTION

One of ordinary skill in the art will appreciate that references throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

The embodiments disclosed herein recognize that users in encrypted messaging environments may forward or copy messages that contain misinformation resulting in increased dissemination of the misinformation.

Figure 1:
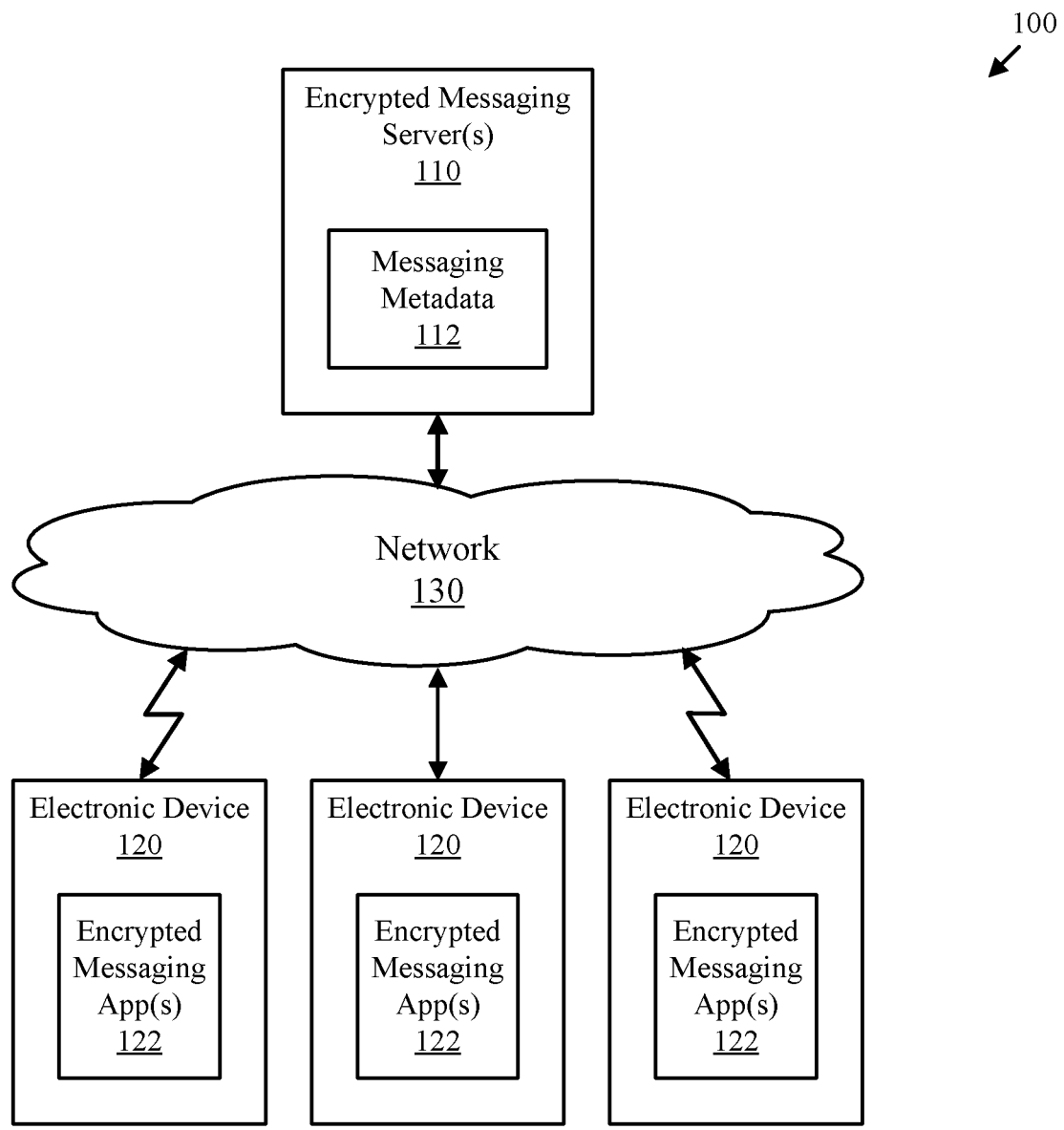
FIG. 1 is a block diagram of one example of a messaging environment where the present invention may be deployed.

FIG. 1 is a block diagram of one example of a messaging environment 100 where the present invention may be deployed. As depicted, the messaging environment 100 includes one or more messaging servers 110 and various electronic devices 120 interconnected via one or more networks 130. The messaging environment 100 enables messaging between users of the electronic devices. 120.

The electronic devices 120 may have one or more encrypted messaging applications (apps) 122 installed thereon that enable users of those devices to send and receive encrypted messages. The encrypted messages may comprise content provided by message originators and copied or forwarded by non-originating users (recipients). In some embodiments, each encrypted message can only be decrypted using a private key corresponding to a specific intended recipient. Sending the same content to multiple recipients may require generating a unique encrypted message for each intended recipient.

The use of encrypted messaging may increase the security and privacy of communications between users. The messaging servers 110 may store metadata 112 that records message identifiers and other attributes such as message length, sender information, recipient information, and various timestamps without storing any information regarding the actual content of the messages.

Figure 2:
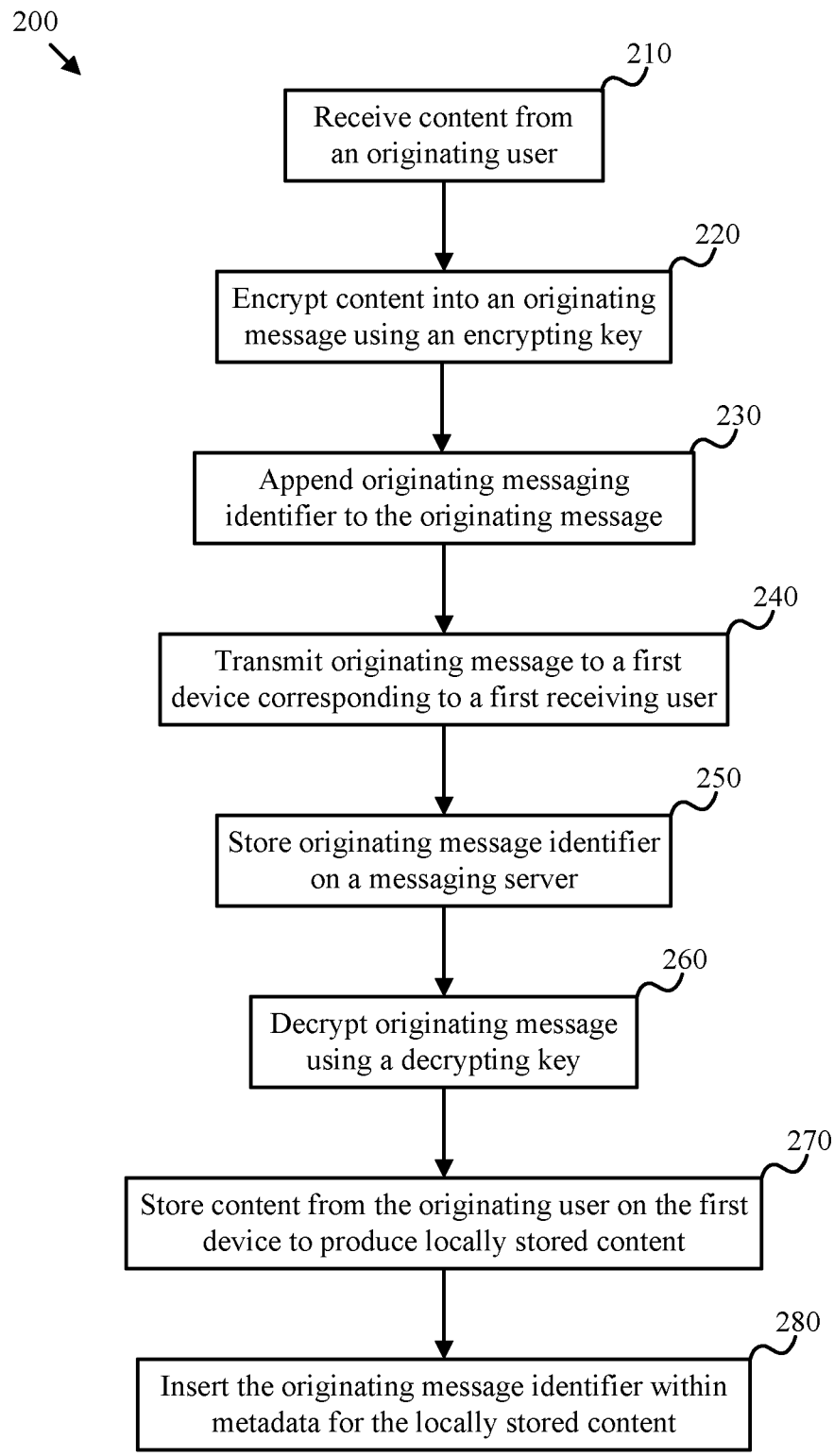
FIG. 2 is a flowchart of one example of a content messaging method in accordance with at least one embodiment disclosed herein.

FIG. 2 is a flowchart of one example of a content messaging method 200 in accordance with at least one embodiment disclosed herein. As depicted, the content messaging method 200 includes receiving (210) content, encrypting (220) the content, appending (230) an originating message identifier, transmitting (240) the originating message, storing (250) the originating message identifier, decrypting (260) the originating message, storing (270) the content and inserting (280) the originating message identifier within metadata for the locally stored content Receiving (210) content may include receiving content from an originating user. The content may include text, documents, URL's, drawings, photos, videos and the like. The messaging apps 122 used to receive the content may provide means to create or specify the content without retaining any of the content.

Encrypting (220) the content may include encrypting the content received from the originating user into an originating message. One or more keys may be used to encrypt the content. In one embodiment, the content is encrypted using a public (encrypting) key corresponding to the intended recipient. Appending (230) an originating message identifier may include inserting the originating message identifier into a message header or other metadata for the originating message.

Transmitting (240) the originating message may include transmitting the originating message to a first device corresponding to a first recipient. Storing (250) the originating message identifier may include storing the originating message identifier on a messaging server in conjunction with transmitting the originating message. Decrypting (260) the originating message may include decrypting the message using a private (decrypting) key corresponding to the recipient. In another embodiment, the message is decrypted using the encrypting key (i.e., a symmetric/secret key).

Storing (270) the content may include storing the content from the originating user on the first device to produce locally stored content. Inserting (280) the originating message identifier within metadata for the locally stored content provides means for determining the originator of the content within the message should the content be copied or forwarded.

Figure 3:
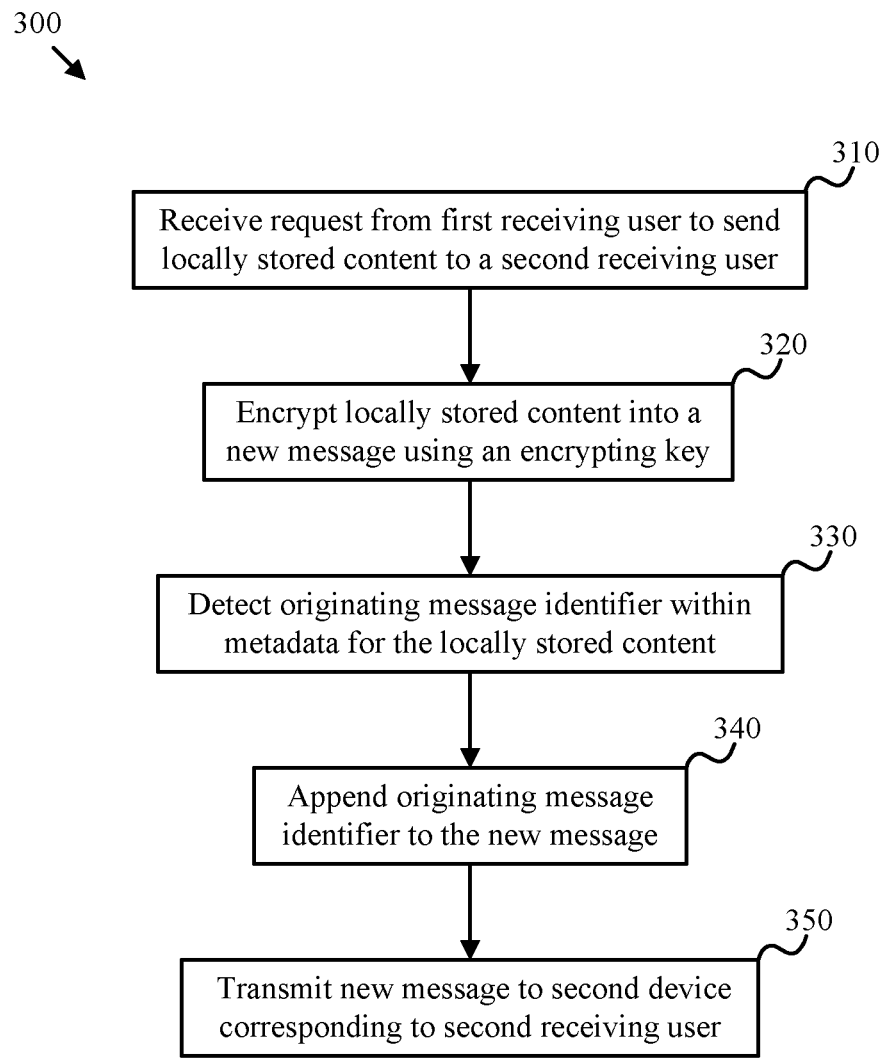
FIG. 3 is a flowchart of one example of a content forwarding method in accordance with at least one embodiment disclosed herein.

FIG. 3 is a flowchart of one example of a content forwarding method 300 in accordance with at least one embodiment disclosed herein. As depicted, the content forwarding method 300 includes receiving (310) a request to send locally stored content, encrypting (320) the locally stored content into a new message, detecting (330) the originating message identifier, appending (340) the originating message identifier to the new message and transmitting (350) the new message.

Receiving (310) a request to send locally stored content may include receiving a request from a first recipient to send locally stored content to a second recipient. Encrypting (320) the locally stored content into a new message may include encrypting the locally stored content into a new message using a public (second encrypting) key corresponding to the second recipient.

Detecting (330) the originating message identifier may include detecting the originating message identifier within metadata for the locally stored content. Appending (340) the originating message identifier to the new message may include inserting the originating message identifier into a header or metadata field for the new message. Transmitting (350) the new message may include transmitting the new message to an electronic device corresponding to the second recipient.

Figure 4A:
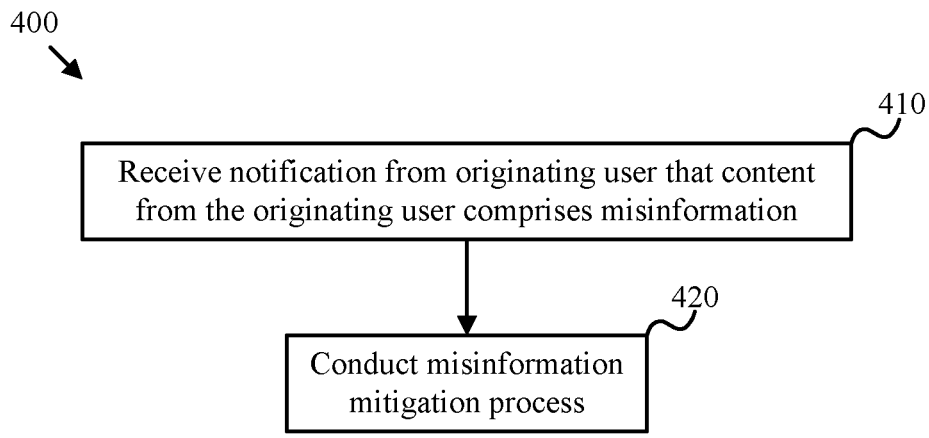
FIG. 4A is a flowchart of one example of a sender-initiated misinformation mitigation method in accordance with at least one embodiment disclosed herein.

FIG. 4A is a flowchart of one example of a misinformation mitigation method 400 in accordance with at least one embodiment disclosed herein. As depicted, the misinformation mitigation method 400 includes receiving (410) notification that content from the originating user comprises misinformation and conducting (430) a misinformation mitigation process. The misinformation mitigation method 400 may be sender-initiated.

Receiving (410) notification that content from the originating user comprises misinformation may include receiving notification from the actual originating user that the content comprises misinformation. Conducting (420) a misinformation mitigation process may include determining which users have received misinformation and retracting messages sent to those users. Determining which users have received misinformation may include accessing data stored on one or more messaging servers to determine which messaging (e.g., metadata) records reference the originating message identifier. The recipients specified in each of the messaging records may be aggregated to produce a set of potentially misinformed users. Those recipients may be informed of the potential misinformation and/or blocked from disseminating the content further.

Figure 4B:
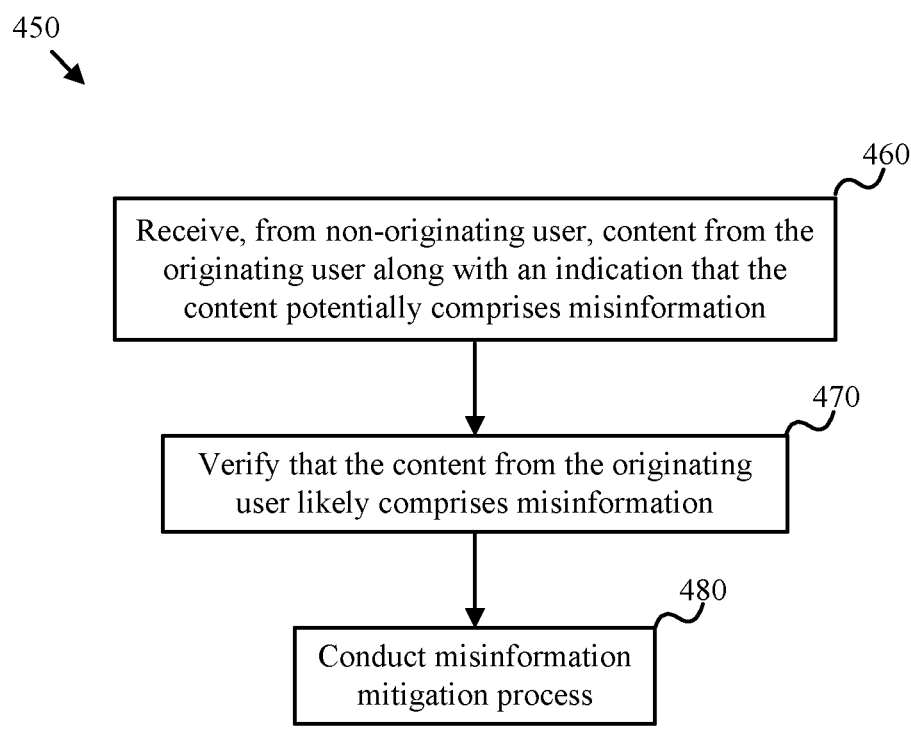
FIG. 4B is a flowchart of one example of a recipient-initiated misinformation mitigation method in accordance with at least one embodiment disclosed herein.

FIG. 4B is a flowchart of one example of a misinformation mitigation method 450 in accordance with at least one embodiment disclosed herein. As depicted, the misinformation mitigation method 400 includes receiving (460) content and notification of potential misinformation, verifying (470) that the content from the originating user comprises misinformation and conducting (480) a misinformation mitigation process. The misinformation mitigation method 400 may be recipient-initiated.

Receiving (460) content and notification of potential misinformation may include receiving, from a non-originating user, content from the originating user along with an indication that the content potentially comprises misinformation. Verifying (470) that the content from the originating user comprises misinformation may include contacting subject matter experts for their evaluation(s) regarding the veracity of the content. Verifying may also include using artificial intelligence to evaluate the content.

In some embodiments, the originating user is informed of the AI and/or expert evaluation(s). The originating user may confirm that the content comprises misinformation or present evidence or arguments as to why the content does not comprise misinformation. Access to the evidence or arguments may be provided to the recipients of the content. In some embodiments, a grievance officer monitors and/or approves communications with the non-originating user and the content recipients.

One of skill in the art will appreciate that the misinformation mitigation process executed by step 480 may be essentially identical to the misinformation mitigation process executed by step 420.

One of skill in the art will appreciate the ability of the disclosed embodiments to mitigate misinformation in an encrypted messaging environment without pre-screening user content. Furthermore, the originator of content can be determined despite message forwarding and the copying of content by recipients. Furthermore, the originator of content may be determined without collecting or screening the content of each composed message.

Figure 5A:
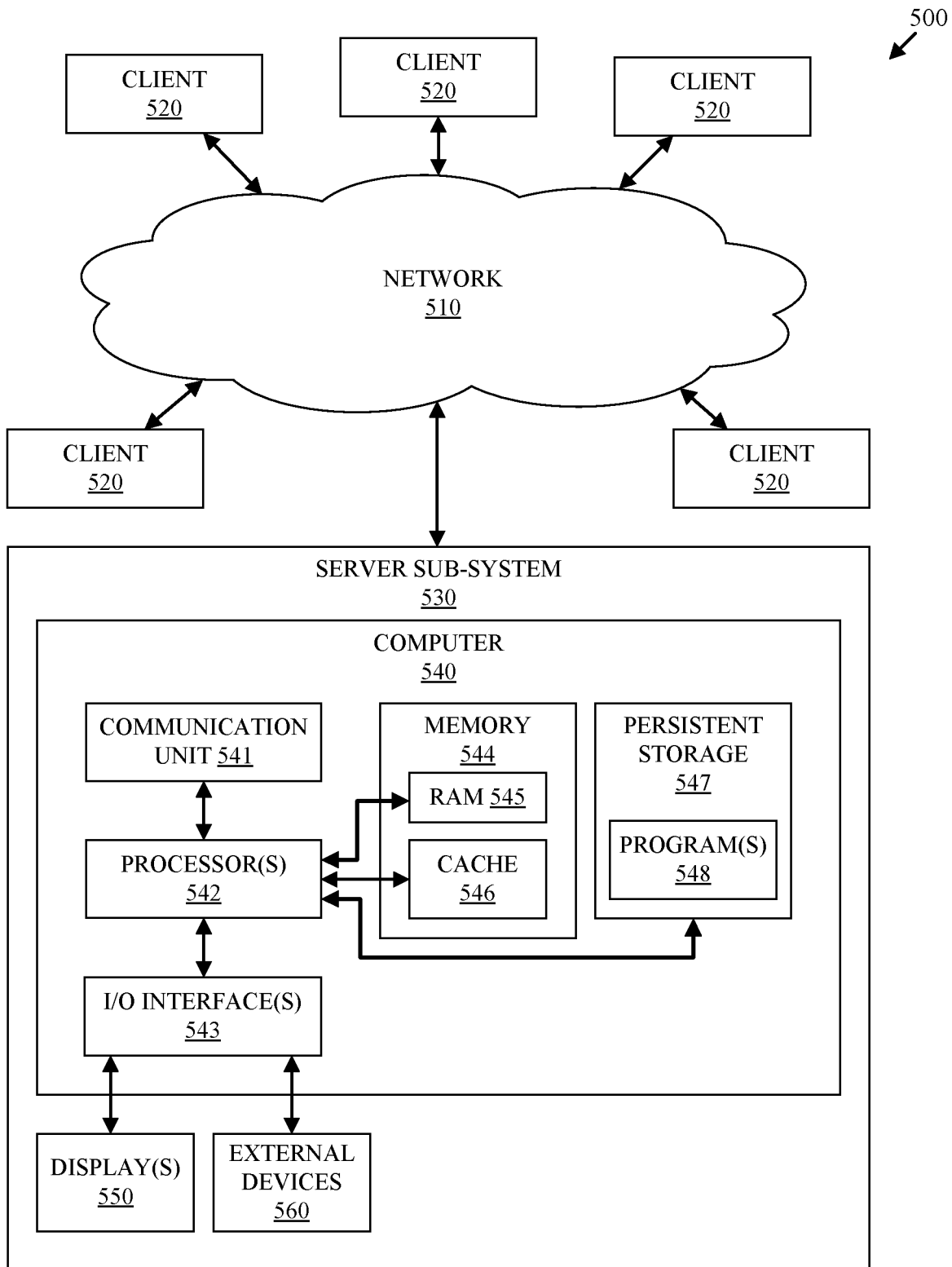
FIG. 5A is a block diagram illustrating various portions of a computing environment in accordance with at least one embodiment disclosed herein.

FIG. 5A is a block diagram illustrating various portions of a computing system 500 in accordance with at least one embodiment disclosed herein. As depicted, computing system 500 includes a communication network 510, one or more client devices 520, and at least one server subsystem 530. The depicted server subsystem 530 includes at least one computer 540 connected to one or more displays 550 and one or more external devices 550. The depicted computer 540 includes a communication unit 541, one or more processors 542, a set of I/O interfaces 543, memory 544, including random access (i.e., main) memory 545 and cache memory 546, and persistent storage 547 that stores one or more programs or executables 548.

Similar to the depicted subsystem 530, the clients 520 may comprise a computer 540. Subsystem 530 and computer 540 are, in many respects, representative of the subsystems and devices that can execute at least a portion of one or more methods disclosed herein. Accordingly, several portions of subsystem 530 and computer 540 will now be discussed in the following paragraphs.

Computer 540 may be a laptop computer, tablet computer, netbook computer, personal computer (PC), desktop computer, personal digital assistant (PDA), smart phone, or any programmable electronic device capable of communicating via network 510. Each executable 548 is a collection of machine readable instructions and/or data that is used to perform at least some of the software functions discussed herein. For example, the methods describe herein may correspond to one or more executables 548.

Computer 540 is capable of communicating with other computing devices, such as the clients 520 and other subsystems 530, via communication network 510. Communication network 510 can be, for example, a local area network (LAN), a wide area network (WAN) such as the Internet, or a combination of the two, and can include wired, wireless, or fiber optic connections. In general, communication network 510 can be any combination of connections and protocols that will support communications between computing devices such as the server subsystem and client subsystems.

Computer 540 is shown as a block diagram with many double arrows. These double arrows (no separate reference numerals) represent a communications fabric, which provides communications between various components of computer 540. This communications fabric can be implemented with any architecture designed for passing data and/or control information between processors (such as microprocessors, communications and network processors, etc.), system memory, peripheral devices, and any other hardware component within a system. For example, the communications fabric can be implemented, at least in part, with one or more buses.

Memory 544 and persistent storage 547 are computer-readable storage media. In general, memory 544 can include any suitable volatile or non-volatile computer-readable storage media. It is further noted that, now and/or in the near future: (i) external device(s) 560 may be able to supply some or all memory for subsystem 530; and/or (ii) devices external to subsystem 530 may be able to provide memory for subsystem 530.

The programs 548 are stored in persistent storage 547 for access and/or execution by one or more of the respective computer processors 542, usually through one or more memories of memory 544. Persistent storage 547: (i) is at least more persistent than a signal in transit; (ii) stores the programs (including its soft logic and/or data) on a tangible medium (such as magnetic or optical domains); and (iii) may be substantially less persistent than permanent storage. Alternatively, data storage may be more persistent and/or permanent than the type of storage provided by persistent storage 547.

Programs 548 may include both machine readable and performable instructions, and/or substantive data (e.g., the type of data stored in a database). In one particular embodiment, persistent storage 547 includes a magnetic hard disk drive. To name some possible variations, persistent storage 547 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 547 may also be removable. For example, a removable hard drive may be used for persistent storage 547. Other examples include optical and magnetic disks, thumb drives, and smart cards that are inserted into a drive for transfer onto another computer-readable storage medium that is also part of persistent storage 547.

Communications unit 541 in the depicted example provides for communications with other data processing systems or devices external to subsystem 520. In these examples, communications unit 541 includes one or more network interface cards. Communications unit 541 may provide communications through the use of either, or both, physical and wireless communications links. Any software modules discussed herein may be downloaded to a persistent storage device (such as persistent storage device 560) through a communications unit (such as communications unit 541).

I/O interface set 543 allows for input and output of data with other devices that may be connected locally in data communication with computer 540. For example, I/O interface set 543 provides a connection to external device set 560. External device set 560 will typically include devices such as a keyboard, keypad, touch screen, and/or some other suitable input device. External device set 560 can also include portable computer-readable storage media such as, for example, thumb drives, portable optical or magnetic disks, and memory cards. Software and data used to practice embodiments of the present invention, for example, programs 548, can be stored on such portable computer-readable storage media. In these embodiments the relevant software may (or may not) be loaded, in whole or in part, onto persistent storage device 560 via I/O interface set 543. I/O interface set 543 also connects in data communication with display device 550. Display device 550 provides a mechanism to display data to a user and may be, for example, a computer monitor or a smart phone display screen.

Figure 5B:
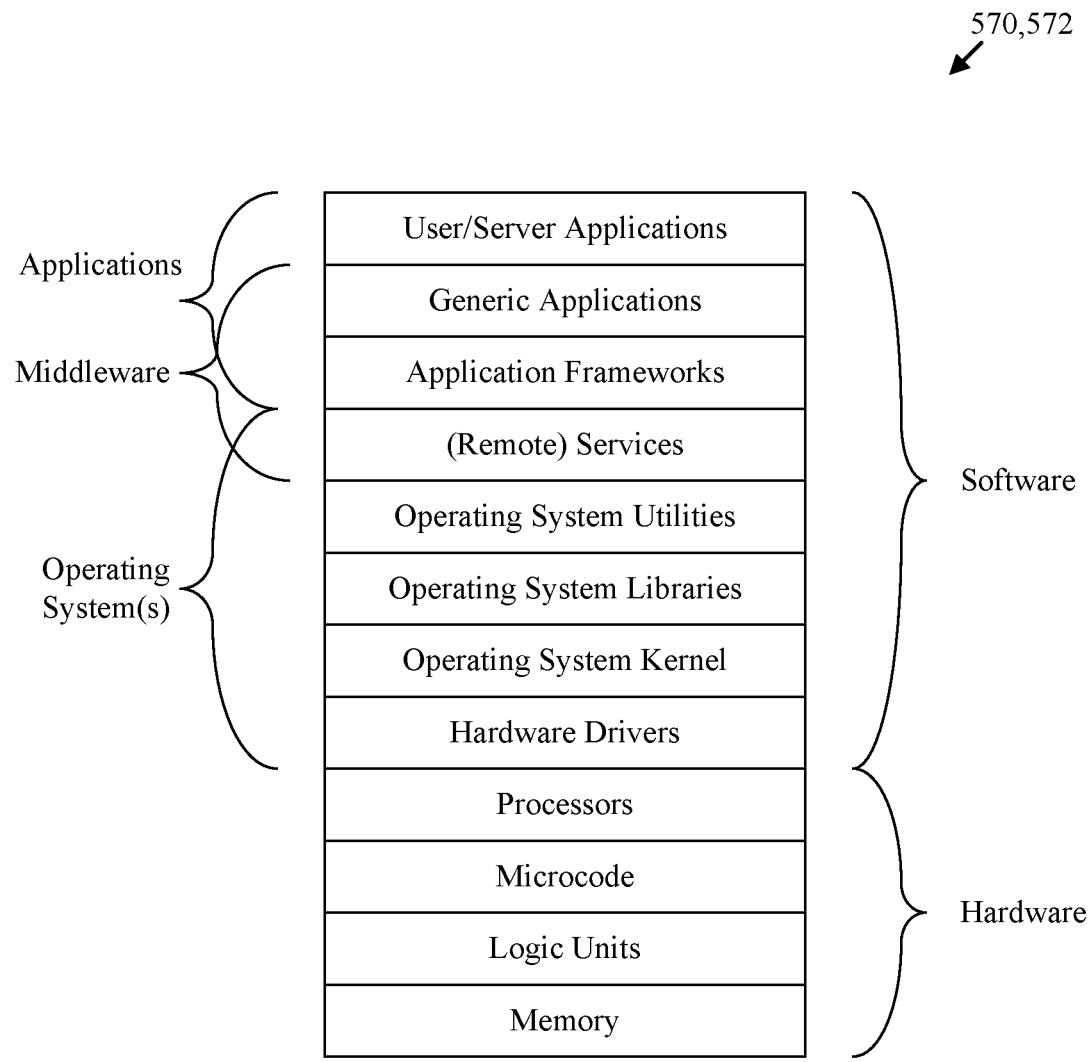
FIG. 5B is a block diagram illustrating one example of a computing stack in accordance with at least one embodiment disclosed herein.

FIG. 5B is a block diagram illustrating one example of a computing stack 570 in accordance with at least one embodiment disclosed herein. As depicted, the computing stack 570 includes a number of computing layers 572 used for conducting computing operations. In the depicted embodiment, the layers include hardware layers and software layers. The various software layers include operating system layers associated with executing one or more operating systems, middleware layers associated with executing middleware that expands and/or improves the functionality of hardware layers, and executing operating system(s). The software layers may also include various application-specific layers. The application-specific layers may include application frameworks that further expand on, and/or improve upon, the functionality of hardware layers and operating system layers.

The memory layer may include volatile memory, non-volatile memory, persistent storage and hardware associated with controlling such memory. The logic units may include CPUs, arithmetic units, graphic processing units, and hardware associated with controlling such units. The microcode layer may include executable instructions for controlling the processing flow associated with moving data between memory and the logic units. The processor layer may include instruction fetch units, instruction decode units, and the like that enable execution of processing instructions and utilization of the underlying hardware layers.

The hardware drivers (also known as the hardware abstraction layer) may include executable code that enables an operating system to access and control storage devices, DMA hardware, I/O buses, peripheral devices, and other hardware associated with a computing environment. The operating system kernel layer may receive I/O requests from higher layers and manage memory and other hardware resources via the hardware drivers. The operating system kernel layer may also provide other functions such as inter-process communication and file management.

Operating system libraries and utilities may expand the functionality provided by the operating system kernel and provide an interface for accessing those functions. Libraries are typically leveraged by higher layers of software by linking library object code into higher level software executables. In contrast, operating system utilities are typically standalone executables that can be invoked via an operating system shell that receives commands from a user and/or a script file. Examples of operating system libraries include file I/O libraries, math libraries, memory management libraries, process control libraries, data access libraries, and the like. Examples of operating system utilities include anti-virus managers, disk formatters, disk defragmenters, file compressors, data or file sorters, data archivers, memory testers, program installers, package managers, network utilities, system monitors, system profilers, and the like.

Services are often provided by a running executable or process that receives local or remote requests from other processes or devices called clients. A computer running a service is often referred to as a server. Examples of servers include database servers, file servers, mail servers, print servers, web servers, game servers, and application servers.

Application frameworks provide functionality that is commonly needed by applications and include system infrastructure frameworks, middleware integration, frameworks, enterprise application frameworks, graphical rendering frameworks, and gaming frameworks. An application framework may support application development for a specific environment or industry. In some cases, application frameworks are available for multiple operating systems and providing a common programming interface to developers across multiple platforms.

Generic applications include applications that are needed by most users. Examples of generic applications include mail applications, calendaring and scheduling applications, and web browsers. Such applications may be automatically included with an operating system.

One of skill in the art will appreciate that an improvement to any of the depicted layers, or similar layers that are not depicted herein, results in an improvement to the computer itself including the computer 540 and/or the client devices 510. One of skill in the art will also appreciate that the depicted layers are given by way of example are not representative of all computing devices. Nevertheless, the concept of improving the computer itself by improving one or more functional layers is essentially universal.

The executables and programs described herein are identified based upon the application or software layer for which they are implemented in a specific embodiment of the present invention. However, it should be appreciated that any particular program nomenclature herein is used merely for convenience, and thus the present invention should not be limited to use solely in any specific identified application or software layer.

The features, advantages, and characteristics of the embodiments described herein may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA), may execute the computer-readable program instructions by utilizing state information of the computer-readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus, or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Some of the functional units described in this specification may have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

In the preceding description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The description of elements in each figure may refer to elements of proceeding figures. Like numbers refer to like elements in all figures, including alternate embodiments of like elements. The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for mitigating misinformation in encrypted messaging environments, the method comprising:
    receiving a first content from an originating user;
    encrypting the first content from the originating user into an originating message using a first encrypting key;
    appending an originating message identifier to the originating message;
    storing the originating message identifier on a messaging server;
    transmitting the originating message with the appended originating message identifier to a first device corresponding to a first recipient; and
    in response to determining that the originating message includes misinformation, tracking further dissemination of the originating message from the first recipient to each subsequent recipient of the originating message to mitigate spread of the misinformation included in the originating message via detecting the appended originating message identifier being further appended by the messaging server to each new message that includes at least a portion of the originating message that is transmitted to each of the subsequent recipients,
    wherein each new message is tracked without pre-screening a second content of each new message.

2. The method of claim 1, wherein appending the originating message identifier to the originating message comprises adding the originating message identifier to a header or metadata for the originating message.

3. The method of claim 1, further comprising:
decrypting the originating message using a first decrypting key;
storing the first content from the originating user on the first device to produce locally stored content;
inserting the originating message identifier within metadata for the locally stored content; and
receiving a request from the first recipient to send the locally stored content to a second recipient.

4. The method of claim 3, further comprising, detecting the originating message identifier within the metadata for the locally stored content.

5. The method of claim 4, further comprising, encrypting the locally stored content into a new message using a second encrypting key.

6. The method of claim 5, further comprising, appending the originating message identifier to the new message.

7. The method of claim 6, further comprising, transmitting the new message to a second device corresponding to the second recipient.

8. The method of claim 1, further comprising, receiving notification from the originating user that the first content from the originating user comprises misinformation.

9. The method of claim 8, further comprising, determining which users have received the first content from the originating user to produce a set of misinformed users.

10. The method of claim 9, further comprising, notifying the misinformed users that the first content from the originating user comprises misinformation.

11. The method of claim 9, further comprising, restricting users from transmitting the first content from the originating user.

12. The method of claim 1, further comprising receiving, from a non-originating user, the first content from the originating user along with an indication that the first content from the originating user may comprise misinformation.

13. The method of claim 12, further comprising, verifying that the first content from the originating user comprises a probability of misinformation.

14. The method of claim 13, further comprising, conducting a misinformation mitigation process in response to verifying that the first content from the originating user comprises a probability of misinformation.

15. The method of claim 13, further comprising, wherein verifying that the first content from the originating user likely comprises misinformation comprises one or more of:
receiving confirmation from the originating user that the first content comprises a probability of misinformation;
using human review; and
using artificial intelligence.

16. The method of claim 1, further comprising, wherein the first content comprises one or more of a photo, a URL, a video, a document and text.

17. A computer program product for mitigating misinformation in encrypted messaging environments, the computer program product comprising a computer-readable storage medium including program instructions embodied therewith, wherein the computer-readable storage medium is not a transitory signal per se, the program instructions executable by a processor to cause the processor to conduct a method comprising:
identifying a plurality of users of a corresponding plurality of electronic devices that are currently located within a selected area;
receiving a first content from an originating user;
encrypting the first content from the originating user into an originating message using a first encrypting key;
appending an originating message identifier to the originating message;
storing the originating message identifier on a messaging server;
transmitting the originating message with the appended originating message identifier to a first device corresponding to a first recipient; and
in response to determining that the originating message includes misinformation, tracking further dissemination of the originating message from the first recipient to each subsequent recipient of the originating message to mitigate spread of the misinformation included in the originating message via detecting the appended originating message identifier being further appended by the messaging server to each new message that includes at least a portion of the originating message that is transmitted to each of the subsequent recipients,
wherein each new message is tracked without pre-screening a second content of each new message.

18. A system for mitigating misinformation in encrypted messaging environments, the system comprising:
one or more processors; and
a computer-readable storage medium including program instructions embodied therewith, wherein the computer-readable storage medium is not a transitory signal per se, the program instructions executable by the one or more processors to cause the one or more processors to conduct a method comprising:
identifying a plurality of users of a corresponding plurality of electronic devices that are currently located within a selected area;
receiving a first content from an originating user;
encrypting the first content from the originating user into an originating message using a first encrypting key;
appending an originating message identifier to the originating message;
storing the originating message identifier on a messaging server;
transmitting the originating message with the appended originating message identifier to a first device corresponding to a first recipient; and
in response to determining that the originating message includes misinformation, tracking further dissemination of the originating message from the first recipient to each subsequent recipient of the originating message to mitigate spread of the misinformation included in the originating message via detecting the appended originating message identifier being further appended by the messaging server to each new message that includes at least a portion of the originating message that is transmitted to each of the subsequent recipients,
wherein each new message is tracked without pre-screening a second content of each new message.

19. The system of claim 18, wherein the method further comprises:
decrypting the originating message using a first decrypting key;
storing the content from the originating user on the first device to produce locally stored content;
inserting the originating message identifier within metadata for the locally stored content;

receiving a request from the first recipient to send the locally stored content to a second recipient;

detecting the originating message identifier within the metadata for the locally stored content;

encrypting the locally stored content into a new message; and appending the originating message identifier to the new message.

20. The system of claim 19, wherein the method further comprises transmitting the new message to a second device corresponding to the second recipient.

\* \* \* \* \*